United States Patent [19]
Nichols

[11] 4,265,186
[45] May 5, 1981

[54] GRAIN DRILL WITH OSCILLATING PLANTER BAR

[76] Inventor: William K. Nichols, P.O. Box 18, Corral, Id. 83322

[21] Appl. No.: 67,606

[22] Filed: Aug. 20, 1979

[51] Int. Cl.³ .......................... A01C 5/06; A01C 19/00
[52] U.S. Cl. ....................................... 111/85; 111/52; 111/86; 172/53; 172/102
[58] Field of Search ...................... 172/53, 78, 54, 101, 172/102, 106, 522; 111/85, 86, 52, 10, 87

[56] References Cited

U.S. PATENT DOCUMENTS

| | | | |
|---|---|---|---|
| 520,890 | 6/1894 | Murray | 111/61 |
| 719,272 | 1/1903 | Steep | 111/86 |
| 1,061,499 | 5/1913 | Rieske | 111/87 |
| 2,755,751 | 7/1956 | Beilke | 111/85 X |
| 3,126,748 | 3/1964 | Mostrong | 111/85 X |
| 3,154,030 | 10/1964 | Williams | 111/1 |
| 3,520,372 | 7/1970 | Beck | 172/101 |
| 3,670,670 | 6/1972 | Vissers | 172/102 X |
| 3,949,813 | 4/1976 | Vanderlely | 172/522 X |
| 4,187,914 | 2/1980 | Vanderlely | 172/102 X |

FOREIGN PATENT DOCUMENTS

| | | | |
|---|---|---|---|
| 330041 | 12/1920 | Fed. Rep. of Germany | 172/102 |
| 1288837 | 2/1969 | Fed. Rep. of Germany | 172/102 |
| 2042884 | 8/1979 | Fed. Rep. of Germany | 172/102 |
| 1080294 | 12/1954 | France | 172/78 |

*Primary Examiner*—Steven A. Bratlie
*Attorney, Agent, or Firm*—Graybeal & Uhlir

[57] ABSTRACT

An apparatus and a method for planting seed are disclosed. The apparatus comprises frame carried by a plurality of ground engaging wheels. Carried on the frame is a means for raising and lowering the frame with respect to the ground. A planter bar having a plurality of seed dispensing boots for penetrating the ground and insertion seeds therein when the frame is lowered is carried by the frame. Means on the frame oscillates the planter bar laterally as the ground engaging wheels move across the ground.

33 Claims, 8 Drawing Figures

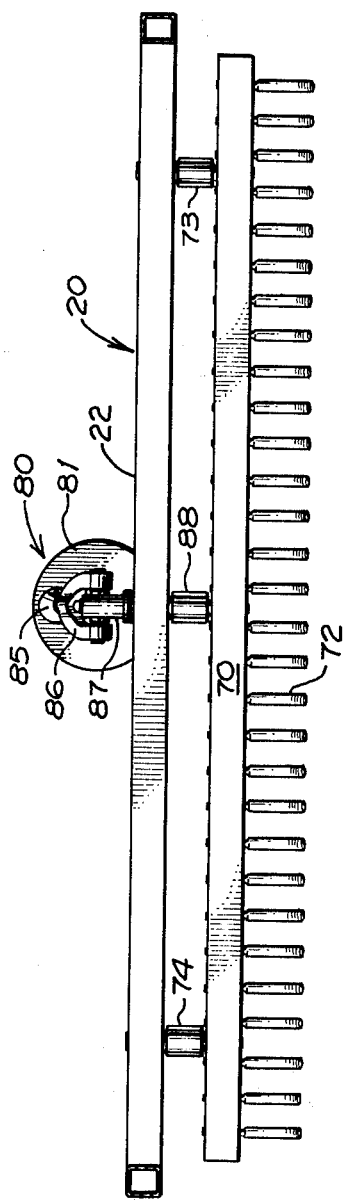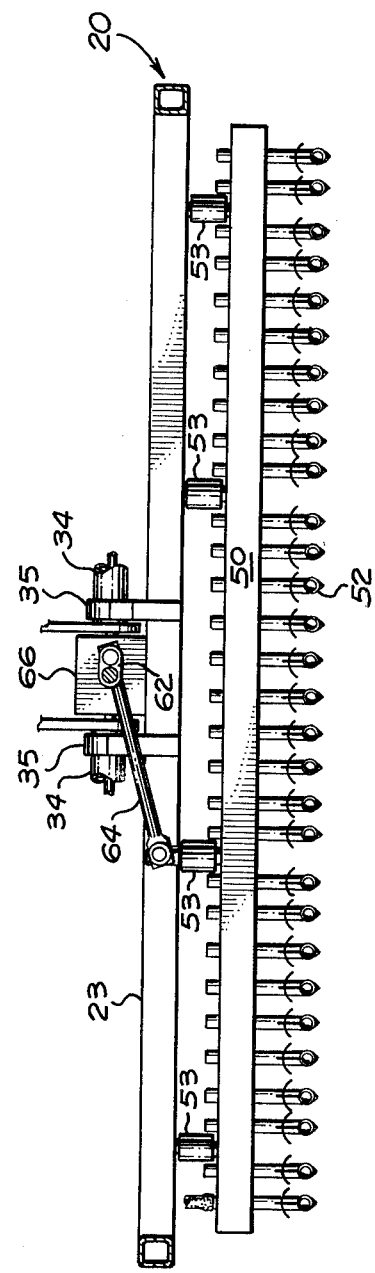

GRAIN DRILL WITH OSCILLATING PLANTER BAR

DESCRIPTION

1. Technical Field

This invention relates to crop planting equipment, and more particularly to an apparatus for planting various types of seed in a plurality of adjacent S-shaped rows.

2. Background Art

Devices to plant seed are old in the art, such as shown by Murray, U.S. Pat. No. 520,890. That device essentially comprises a rectangular frame supported at its rear end by a pair of wheels, and at its front by a steerable caster wheel. An elongate seed hopper is disposed within the frame at its forward end. As the frame moves over the ground, the seed hopper moves in a side-to-side manner within the frame, agitating and sifting the seed through a screen. The seed subsequently passes through the screen coming to rest on the ground. A plurality of shovels in ground engagement turn the soil to ensure some of the seed resting on the ground penetrates the soil. This device has several disadvantages. Initially, the seed distribution pattern on the ground is unpredictable and non-uniform resulting in inefficient utilization of the ground available for planting. Secondly, by turning the soil after the seeds have been randomly placed on the ground, some seed is planted deeper than other seed thereby producing plants with significantly variable growing times. Finally, by turning the soil in the above manner, some seeds never get planted causing a partial loss of the crop.

An improved device for planting seed is shown by Williams, U.S. Pat. No. 3,154,030. That device uses multiple seed dispensing hoppers in an offset relationship with respect to each other. The seeds are subsequently dispensed by the hoppers in a plurality of longitudinally extending rows with seeds in one row being in staggered relationship with the seeds in an adjacent row. The device has a significant disadvantage in that the seeds are planted in adjacent straight rows making the crop susceptible to damage from wind and water erosion. This is particularly true when the plants initially begin to grow, or when the plants are quite small.

The present invention provides a seed planting apparatus dispensing and planting seed in the ground in a plurality of adjacent S-shaped rows. The shape of the rows minimizes the susceptability of the crop to damage caused by either washout or wind erosion. Since the disclosed apparatus dispenses seeds in the ground in furrows formed by a plurality of seed dispensing boots in ground engagement, loss of seed is minimal thereby increasing both the crop production and use of the land available for planting. By covering the seeds to a precise depth within the furrows immediately after the seeds have been dispensed in furrows, the present invention efficiently utilizes the soil's nutrients and natural moisture saving at least one irrigation. Finally, by preparing the ground essentially concurrently with the formation of furrows, the present invention allows the ground to be worked earlier in the spring, with the ground preparation and planting being performed in but a single operation.

DISCLOSURE OF THE INVENTION

According to one aspect of the present invention, an apparatus for planting seed comprises a frame carried by a plurality of ground engaging wheels. A means on the frame raises and lowers the frame with respect to the ground. A planter bar carried by the frame has a plurality of seed dispensing boots for penetrating the ground and inserting seeds in the ground when the frame is lowered. Means on the frame oscillates the planter bar laterally as the ground engaging wheels move across the ground.

According to another aspect of the present invention, a method of planting seed comprises the steps of lowering a frame toward the ground until a plurality of seed dispensing boots disposed on a planter bar carried by the frame penetrates the ground. The planter bar is oscillated laterally as the frame is moved over the ground. Seeds are dispensed through each of the seed dispensing boots and inserted into the ground as the planter bar is oscillated.

An object of the present invention is to provide an apparatus for planting seed producing a seed distribution pattern making better use of the ground's natural nutrients and moisture.

Another object of the present invention is to provide an apparatus for planting seed producing a seed distribution pattern having a reduced susceptibility to wind erosion.

A still further object of the present invention is to provide an apparatus for planting seeds to a precise deth.

A still further object of the present invention is to provide an apparatus more efficiently utilizing the ground available for planting, thereby raising the crop production per unit of ground.

A still further object of the present invention is to provide an apparatus enabling a farmer to work the ground and plant a crop in but a single operation.

The foregoing, and other objects, features, and advantages of the present invention will become more apparent in light of the detailed description of the preferred embodiments thereof set forth hereafter, and illustrated in the accompanying drawings.

BRIEF DESCRIPTION OF THE DRAWINGS

FIG. 7 is a cross sectional view taken along lines 7—7 in FIG. 3.

FIG. 8 is a cross sectional view taken along lines 8—8 in FIG. 3.

BEST MODE OF CARRYING OUT THE INVENTION

Figure 1:
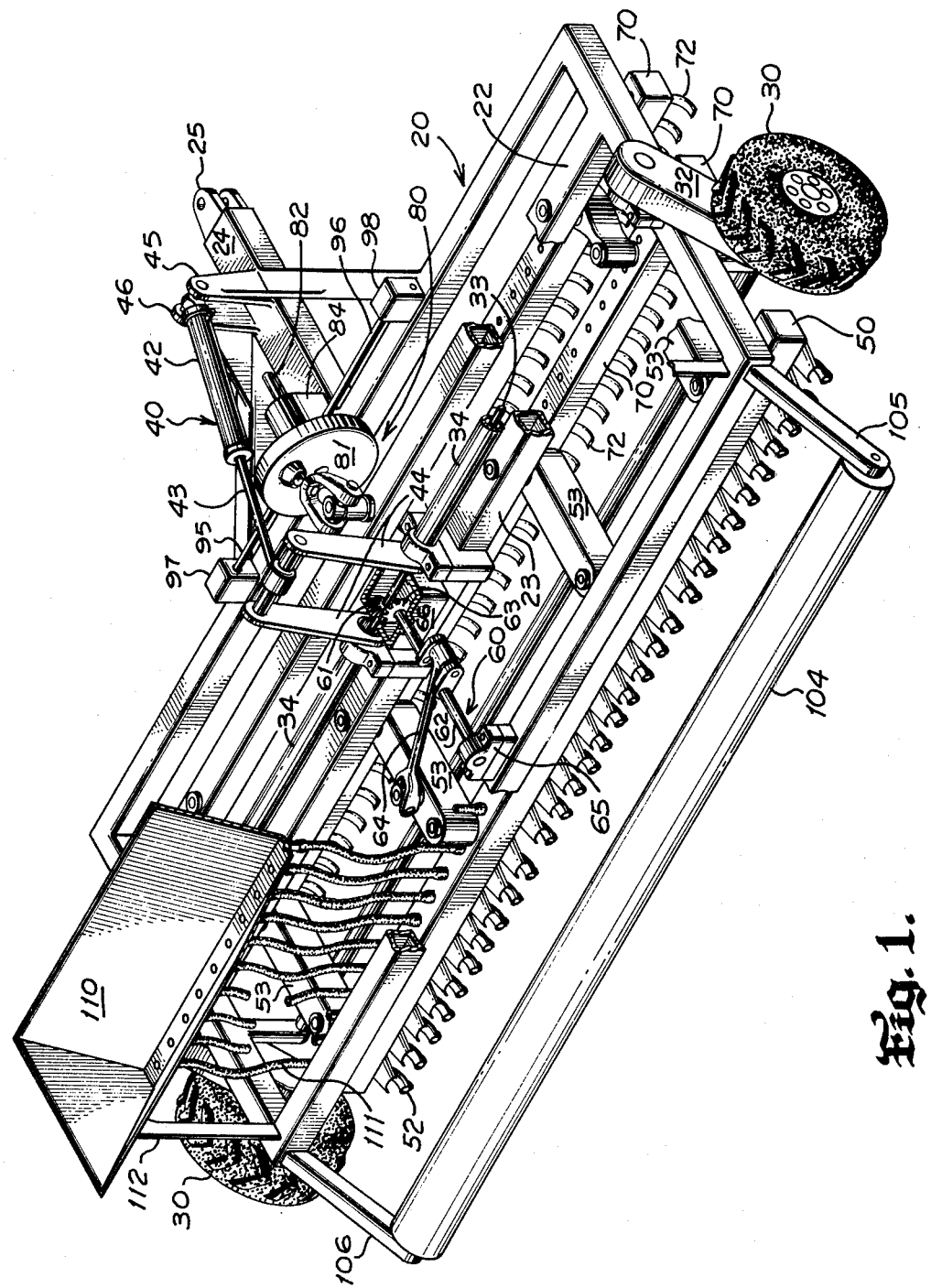
FIG. 1 is a perspective view of a typical embodiment of the present invention with portions shown partially broken away for clarity.
Figure 2:
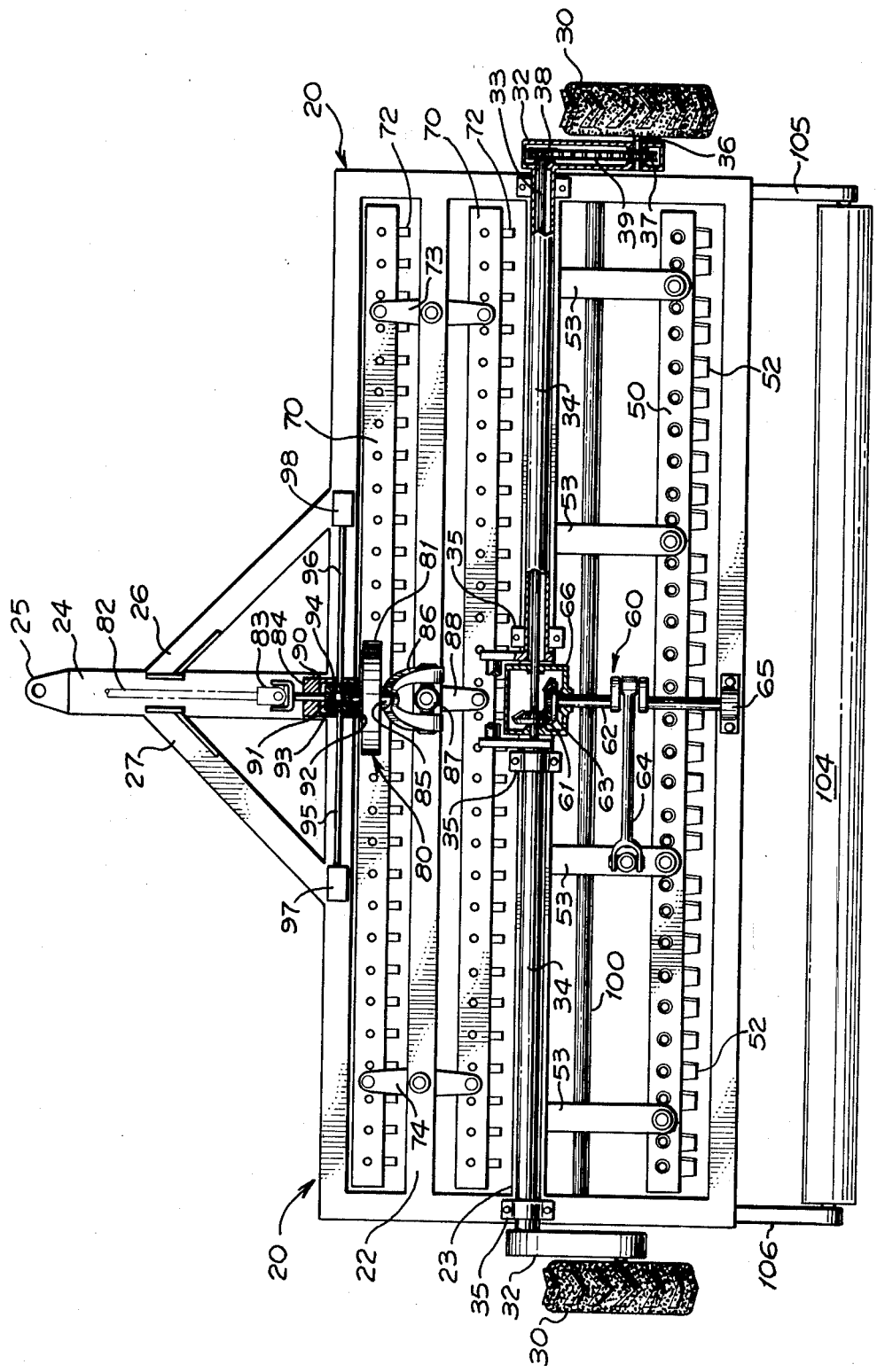
FIG. 2 is a top plan view of a typical embodiment of the present invention with portions removed and others shown partially broken away.

With reference to FIGS. 1 and 2, an apparatus for planting seed according to the present invention generally comprises a frame, shown at 20, carried by a plurality of ground engaging wheels 30. A means 40 on the frame (see FIG. 2) raises and lowers the frame with respect to the ground. A planter bar 50 carried by the frame has a plurality of seed dispensing boots 52 for penetrating the ground and inserting seeds in the ground when the frame is lowered. A means 60 for oscillating the planter bar is carried on the frame and moves the planter bar laterally from side to side as the ground engaging wheels move across the ground. A plurality of harrow bars 70 for preparing the ground before the seeds have been inserted are carried by the frame at its forward end. Each harrow bar has a plurality of cutter knives 72 for penetrating the ground when the frame is lowered. A means 80 for oscillating the harrow bars moves the harrow bars laterally in opposition directions with respect to each other. A seed box 110 on the rear of the frame is in communication with each of the seed dispensing boots and provides the housing for a supply of seeds. The seeds are dispensed to each seed dispensing boot as the ground engaging wheels move across the ground. Each of the elements of the present invention will next be described in more detail.

The frame 20 is typically rectangular in shape and has a plurality of cross members 22, 23 extending across the width of the frame providing structural rigidity to the frame. These members also enable the planter bar 50 and the plurality of harrow bars 70 to be movably attached below the frame as will be discussed below. A tongue 24 rigidly attached to the frame, such as by welding or the like, projects outwardly from the forward end of the frame. The tongue has an extension 25, such as a shackle or the like for attaching the frame to typical farm machinery such as a tractor. The extension is old per se. Cross members 26, 27 rigidly attached to both the frame and the tongue provide additional structural support to the tongue. The frame, cross members, and the tongue are all constructed from metal, such as steel. In a typical embodiment, the frame, and support members are characterized by a hollow rectangular cross section being substantially six inches wide by four inches high.

The frame is carried by a plurality of ground engaging wheels 30 disposed generally outboardly from mid-frame adjacent each side of the frame. Between each ground engaging wheel and the frame is a floatation arm 32 connecting the corresponding ground engaging wheel to the frame. Each floatation arm is rigidly attached to an axle shaft housing 34 (see FIGS. 1, 2) carried on the frame and rotatably attached to the support member 23 and frame through a plurality of bearings 35. Within the axle shaft housing is an axle shaft 33 having a plurality of first sprocket gears 38 attached to its opposite ends. The first sprocket gear is housed within each floatation arm. Each ground engaging wheel is rotatably attached to its corresponding floatation arm by a wheel axle 36 projecting outwardly from the ground engaging wheel. Attached to the end of each wheel axle is a second sprocket gear 37 also housed within the flotation arm. Linkably connecting the first and second sprocket gears is a chain 39. The rotation of a ground engaging wheel is coupled by the wheel axle, first and second sprocket gears, and chain to the means for oscillating the planter bar 60 as will be discussed more fully below.

A means 40 carried on the frame raises and lowers the frame with respect to the ground. The means generally comprises a hydraulic actuated ram 42, operable by a tractor or the like, and a piston rod 43. A plurality of floatation arm connecting members 44 are rigidly attached to the axle shaft housing and are linkably attached to the hydraulic ram and piston rod. The plurality of flotation arm connecting members in conjunction with the hydraulic ram and piston rod are operable in a push-pull manner to raise and lower the frame with respect to the ground. When the rams 42 is activated to pull the piston, the plurality of floatation arm connecting members are urged downwardly toward the frame rotating the axle shaft housings in a clockwise direction (see FIG. 1). The clockwise rotation of the axle shaft housing is coupled through the plurality of flotation arms urging the ground engaging wheels upwardly toward the frame and the planter boots 52 into ground engagement. When the hydraulic ram is operable to push the piston, the flotation arm connecting members are urged in a direction so as to rotate the axle shaft housing in a counterclockwise direction. This counterclockwise rotation is coupled by the axle shaft housing to the floatation arms and the ground engaging wheels. In this manner, the frame is raised with respect to the ground lifting the planter boots away from ground engagement. The hydraulic ram and piston rod 43 are supported above the extension by uprights 45, 46 rigidly secured to extension. The hydraulic ram 42 and piston rod 43 are old per se.

A planter bar 50 is carried by the frame and includes a plurality of seed dispensing boots 52 for penetrating the ground and inserting seeds in the ground when the frame is lowered. The planter bar is movably attached below the frame by a plurality of planter bar support arms 53 connecting the planter bar to the cross member 23. Each planter bar support arm is rotatably connected to the planter bar and the cross member 23 by means which are old per se. Although the embodiment in FIGS. 1 and 2 only shows two planter bar support arms, any number of support arms may be used to attach the bar below the frame.

In the preferred embodiment, the planter bar is made from metal, such as steel or the like, and typically has a rectangular cross section.

Figure 4:
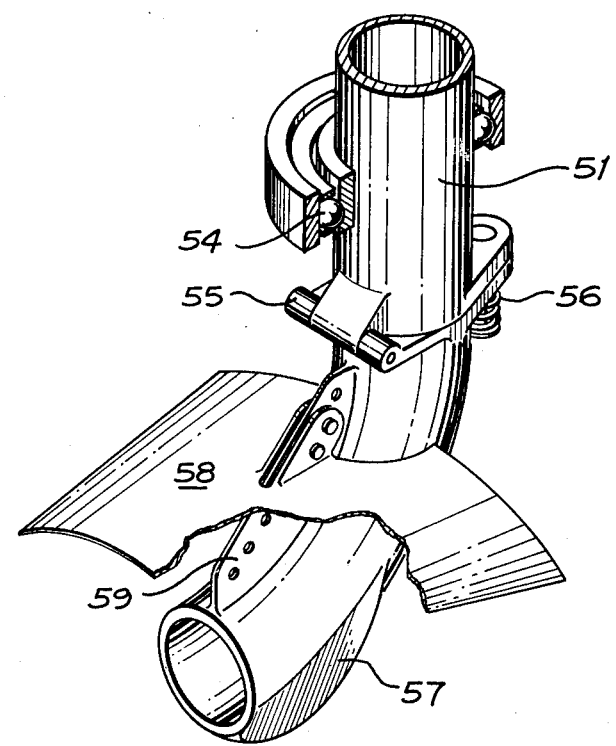
FIG. 4 is a perspective view of a typical embodiment of a seed dispensing boot according to the present invention with portions shown partially broken away.
Figure 5:
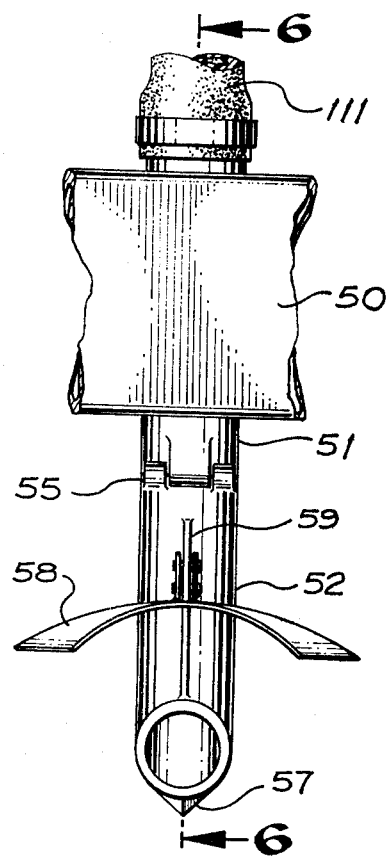
FIG. 5 is a rear elevational view of a typical seed dispensing boot according to the present invention.
Figure 6:
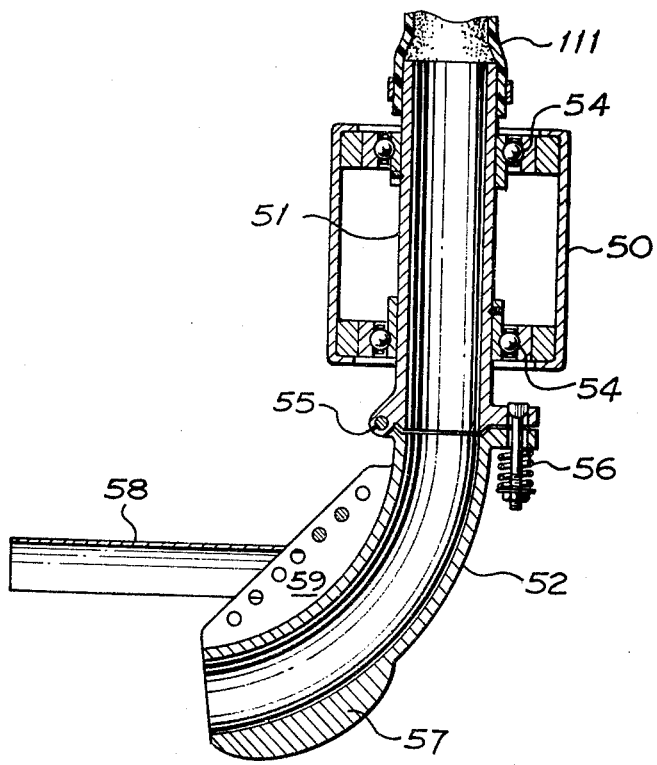
FIG. 6 is a cross sectional view taken along lines 6—6 in FIG. 5.

The planter bar carries a plurality of seed dispensing boots 52 extending through the planter bar and in communication with the seed box 110 through an upper shaft 51 and a plurality of flexible hoses 111 as will be discussed below. With reference to FIGS. 4–6, each dispensing boot generally is an elongate tube and is characterized by a curved side elevation. Each seed dispensing boot is hingeably connected to an upper shaft 51 extending through the planter bar. Disposed around the upper shaft adjacent the planter bar is a swivel means generally comprising a plurality of annular bearings 54. These bearings permit the upper shaft and the seed dispensing boot to rotate freely with respect to the planter bar. The annular bearings are old per se. Each seed dispensing boot is attached to the upper shaft by a hinge 55 and spring means 56. The hinge and spring means allow the seed dispensing boot to be deflected upwardly toward the planter bar in the event the seed dispensing boot engages an obstruction within the ground. When the obstruction has been passed, the spring means urges the seed dispensing boot back into engagement with the ground. Disposed on each seed dispensing boot is a ground penetrating blade 57. The blade has a leading edge for penetrating the ground as the frame is lowered and the seed dispensing boot engages the ground. The seed dispensing boots are disposed on the planter bar substantially in a straight line along its length, with the spacing between adjacent seed dispensing boots being from between six to eight inches.

With reference to FIGS. 4-6, disposed above each seed dispensing boot is a furrow covering plate 58. The plate is slightly curved toward the ground and is shaped to extend outwardly around the seed dispensing boot to engage the ground on either side of the furrow and cover the same after the seeds have been inserted in the ground. As shown in FIG. 4, in the preferred embodiment, each seed dispensing boot carries its own furrow covering plate. Extending upwardly from the seed dispensing boot is a lip 59 having a plurality of holes therein. The furrow covering plate is secured to the lip by means which are old per se, such as by the use of a plurality of bolts or the like extending through the holes on the lip. In this manner, the furrow covering plate may be adjusted in height above the seed dispensing boot to cover the seeds to a precise depth. It is to be noted that although the preferred embodiment shows a furrow covering plate carried by each seed dispensing boot, a single furrow covering plate may be carried by the frame without departing from the teachings of the present invention.

A means for oscillating the planter bar, shown at 60, is carried on the frame and moves the planter bar laterally below the frame as the ground engaging wheels move across the ground. The means generally comprises a plurality of planter bar support arms (discussed above) movably attaching the planter bar below the frame. With reference to FIG. 2, a driving gear 61 is carried on the frame and is rigidly attached to the axle shaft 33. A planter bar drive crank 62 has a driven gear 63 at one end in a meshing relation with the driving gear so that movement of the driving gear rotates the driven gear and the crank. The crank has a connecting arm 64 linkably in communication with a planter bar support arm so that movement of the crank is coupled to the planter bar. The crank is attached to the frame at one end through a bearing 65 and at the other end to a gear box 66. The gear box 66 and the means linkably attaching the connecting arm with the crank and the planter bar support arm are old per se. As each ground engaging wheel moves across the ground, its rotation is coupled to the driving gear through the sprocket gears and axle shaft to the drive crank. The drive crank thereafter rotates in either a clockwise or counterclockwise direction (depending upon the direction of travel of the frame) laterally oscillating the planter bar below the frame. The rotation of the crank allows the planter bar to move substantially between six to eight inches.

In an alternate embodiment, a plurality of driving gears are attached to the axle shaft and are in a meshing relation with the driven gears. In this instance, the axle shaft is separated between the driving gears so as to enable the fastest rotating ground engaging wheel in conjunction with a ratchet means (not shown) to drive the crank and oscillate the planter bar. A second connecting arm attached to the crank and linkably in communication with another planter bar support arm may be used to impart a more positive lateral oscillation to the planter bar.

A plurality of harrow bars 70 are generally disposed below the frame at the forward end. Each harrow bar carries a plurality of cutter knives 72 for penetrating the ground when the frame is lowered. The cutter knives are generally curved away from the forward end of the frame, and are characterized by a generally eliptical cross section. The cutter knives are secured to the harrow bars by a plurality of shear bolts (not shown) enabling the cutter knives to break away from the harrow bars in the event the knives strike an object within the ground. The harrow bars are suspended below the frame by a plurality of harrow bar support arms 73, 74, rotatably attached to both cross member 22 and to the harrow bars. The means for rotatably attaching the support arms are old per se. It is to be understood that additional harrow bar support arms may be provided to support the harrow bar depending upon the weight of the bars. The spacing between adjacent cutter knives in each harrow bar can vary depending upon the application, but it has been found that the optimum distance is from between six to eight inches.

Figure 3:
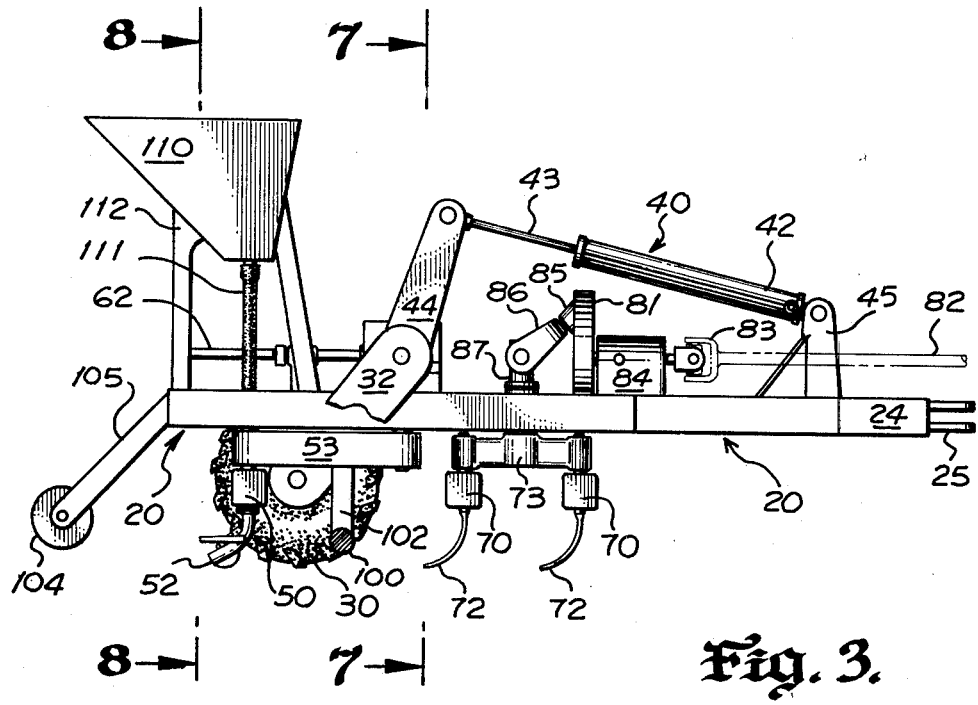
FIG. 3 is a side elevational view of a typical embodiment of the present invention with portions shown partially broken away.

A means for oscillating the harrow bars, shown generally at 80, is carried by the frame and moves each harrow bar laterally below the frame. The means generally comprises a flywheel 81 connected to the tractor power takeoff unit by a flywheel shaft 82, and universal joint 83. The flywheel is attached to the extension through bearing 84. Connected to the peripheral edge of the fly wheel is a flywheel arm 85 linkably connected to universal joint 86 (see FIG. 3). The universal joint is rotatably connected to a drive shaft 87 extending through the cross member 22. The drive shaft is rigidly secured to a harrow bar drive arm 88 rotatably attached to each harrow bar. When the tractor power takeoff unit is in operation, the rotational movement of the flywheel shaft is coupled through the universal joint to the flywheel. This imparts a circular motion to the flywheel which in turn is coupled by the flywheel arm and universal joint through the drive shaft to the drive arm. The rotational movement of the flywheel and the drive shaft causes the harrow bars to oscillate laterally below the frame with one harrow bar moving in the opposite direction from the other harrow bar.

In an alternative embodiment, a gear box 90 may be disposed between the universal joint 83 and the bearing 84. A plurality of driving gears 91, 92 are included within the gear box and are in a meshing relation with a plurality of driven gears 93, 94. The driven gears are connected through shafts 95, 96 to a plurality of hydraulic pumps 97, 98 carried on the frame. The hydraulic pumps may be operably connected by flexible tubes or the like to pump motors carried on other grain drills. These pump motors are operable to power the harrow bars for that grain drill. In this manner, one tractor may operate a plurality of grain drills.

A leveling bar 100 is carried below the frame by a plurality of support members 102 and engages and penetrates the ground when the frame is lowered. The support members have a plurality of holes (not shown) enabling the leveling bar to be attached to the support members by a plurality of bolts (not shown) extending through the holes. In this manner, the leveling bar may be adjusted to engage and penetrate the ground to any desired depth depending upon the amount of natural moisture in the ground at the time the ground is prepared for planting. A roller 104 carried by the frame compacts the ground after the seeds have been inserted in the ground and covered by the furrow plate. In one embodiment of the present invention, the roller extends the width of the frame and is rigidly attached to the frame by a plurality of support members 105, 106. In another embodiment, the roller is attached to the frame by a spring means or the like enabling the roller to follow more closely the contours of the ground as the ground engaging wheels move across the ground.

A seed box 110 is in communication with eachh of the seed dispensing boots by a flexible tube. The seed box carries a supply of seed and is disposed above the frame by a plurality of support members 112. Means for metering the seed from the seed box to each seed dispensing boot is old per se, such as typically manufactured by Oliver Superior Company. In a typical operation, the seeds are dispensed through the flexible tubes upon rotation of the ground engaging wheels. Above each seed dispensing boot is a wheel having a selectible opening. The wheel is chain driven from the ground engaging wheels and allows a window within the wheel to periodically dispense a seed from the seed box through the flexible tube to each planting boot.

I claim:

1. An apparatus for planting seed comprising:
   (a) a frame carried by a plurality of ground engaging wheels;
   (b) means for raising and lowering said frame with respect to the ground;
   (c) a planter bar carried by said frame carrying a plurality of seed dispensing boots for penetrating the ground and inserting seeds therein when said frame is lowered, wherein each seed dispensing boot includes a ground penetrating blade having a leading edge for forming a furrough in the ground in which to insert seeds, with each of said seed dispensing boots connected to said planter bar by swivel means enabling each seed dispensing boot to rotate freely and said ground penetrating blade to steer said seed dispensing boot along the ground track of said planter bar as said frame is moved over the ground, and wherein each seed dispensing boot is attached to said swivel means by a means enabling each seed dispensing boot to be deflected upwardly toward said frame upon engaging an obstruction in the ground, the said means urging said boot into ground engagement when the boot no longer engages the obstruction, and wherein each seed dispensing boot includes a furrough covering plate disposed above and outwardly around each seed dispensing boot, each furrough covering plate being curved and engaging the ground on either side of the furrough and covering the furrough after seeds have been inserted therein;
   (d) means for oscillating said planter bar laterally as said ground engaging wheels move across the ground.

2. The apparatus of claim 1 wherein said means for raising and lowering said frame comprises:
   (a) a plurality of floatation arms rotatably attached to said frame connecting said frame to each of said ground engaging wheels;
   (b) a floatation arm connecting member connecting one floatation arm to another;
   (c) actuation means carried on said frame linkably attached to said floatation arm connecting member and operable to pull said floatation arm connecting member to lower said frame, and operable to push said floatation arm connecting member to raise said frame.

3. The apparatus of claim 1 wherein said means for oscillating said planter bar comprises:
   (a) a plurality of planter bar support arms movably attaching said planter bar to said frame;
   (b) a driving gear carried on said frame operable by the rotation of said ground engaging wheels;
   (c) a planter bar drive crank linkably connected to said planter bar support arms having a driven gear in meshing relation with said driving gear so that movement of said driving gear rotates said crank and oscillates said planter bar.

4. The apparatus of claim 1 wherein the distance said planter bar moves laterally is from between six to eight inches.

5. The apparatus of claim 1 wherein the distance between adjacent seed dispensing boots is from between six to eight inches.

6. The apparatus of claim 1 further comprising a leveling bar engaging the ground when said frame is lowered for leveling the ground before seeds are inserted into the ground.

7. The apparatus of claim 1 further comprising a seed box on said frame for carrying a supply of seed, said seed box being in communication with each of said seed dispensing boots dispensing seeds through same in response to the rotation of said ground engaging wheels.

8. The apparatus of claim 6 further including an apparatus for preparing the ground before the ground has been leveled, the said apparatus comprising:
   (a) a plurality of harrow bars carried by said frame each having a plurality of cutter knives penetrating the ground when said frame is lowered;
   (b) means for oscillating said harrow bars laterally.

9. The apparatus of claim 8 wherein each cutter knife is characterized by a generally tapered cross section permitting each knife to easily move through the ground as said harrow bars are laterally oscillated.

10. The apparatus of claim 8 wherein each cutter knife is characterized by a generally curved side elevation permitting each knife to easily move through the ground as said frame travels over the ground.

11. The apparatus of claim 8 wherein each cutter knife is secured to said harrow bar by a shear bolt.

12. The apparatus of claim 8 wherein the spacing between adjacent cutter knives on each harrow bar is from between six to eight inches.

13. The apparatus of claim 8 wherein the means for oscillating said harrow bars comprises:
   (a) a plurality of harrow bar support arms movably attaching said harrow bars to said frame;
   (b) a flywheel carried by said frame and rotationally operable by an external power source;
   (c) a connecting member attached to the periphery of said flywheel linkable connected to said support arms so that rotational movement of said flywheel causes said harrow bars to move laterally in opposite directions from each other.

14. The apparatus of claim 1 wherein said furrough covering plate is adjustable in height above each dispensing boot permitting the seeds to be covered to an adjustable depth.

15. The apparatus of claim 1 further comprising a roller attached to said frame compacting the ground after the seeds have been inserted into the ground and the furroughs have been covered.

16. The apparatus of claim 15 wherein said roller is rigidly attached to said frame.

17. The apparatus of claim 15 wherein said roller is movably attached to said frame and is urged toward the ground.

18. A seed planting apparatus comprising:

(a) a frame carried by a plurality of ground engaging wheels;

(b) means for raising and lowering said frame in relation to the ground;

(c) a planter bar carried below said frame having a plurality of seed dispensing boots each having a ground penetrating blade, each boot and blade penetrating the ground forming a furrough and inserting seeds therein when said frame is lowered and moved over the ground and wherein each seed dispensing boot is carried on said planter bar by swivel means permitting said ground penetrating blade to steer said seed dispensing boot along the ground track of said planter bar as said frame is moved over the ground, and wherein each seed dispensing boot is attached to said swivel means by a means enabling each boot to be deflected upwardly towards said frame upon engaging an obstruction in the ground, the said means urging said boot into ground engagement when the boot no longer engages the obstruction, and wherein each seed dispensing boot includes a furrough covering plate disposed above and outwardly around each seed dispensing boot, each furrough covering plate being curved and engaging the ground on either side of the furrough and covering the furrough after seeds have been inserted therein;

(d) a plurality of planter bar support arms movably attaching said planter bar below said frame;

(e) a driving gear carried on said frame and rotatable by the rotation of said ground engaging wheels;

(f) a planter bar crank linkably connected to said planter bar support arms having a driven gear in meshing relation with said driving gear so that movement of the driving gear rotates said crank and oscillates said planter bar laterally below said frame.

19. The apparatus of claim 18 wherein said means for raising and lowering said frame comprises:

(a) a plurality of floatation arms rotatably attached to said frame connecting said frame to each of said ground engaging wheels;

(b) a floatation arm connecting member connecting one floatation arm to another;

(c) actuation means carried on said frame linkably attached to said floatation arm connecting member and operable to pull said floatation arm connecting member to lower said frame, and operable to push said floatation arm connecting member to raise said frame.

20. The apparatus of claim 18 wherein the distance said planter bar laterally moves below said frame is from between six to eight inches.

21. The apparatus of claim 18 wherein the distance between adjacent seed dispensing boots is from between six to eight inches.

22. The apparatus of claim 18 further comprising a leveling bar engaging with the ground when said frame is lowered for leveling the ground before seeds are inserted into the ground.

23. The apparatus of claim 22 further including an apparatus for preparing the ground before the ground has been leveled, the said apparatus comprising:

(a) a plurality of harrow bars carried below said frame each having a plurality of cutter knives penetrating the ground when said frame is lowered;

(b) means for oscillating said harrow bars laterally below said frame.

24. The apparatus of claim 23 wherein each cutter knife is characterized by a generally tapered cross section permitting each knife to easily move through the ground as said harrow bars are laterally oscillated.

25. The apparatus of claim 23 wherein each cutter knife is characterized by a generally curved side elevation permitting each knife to easily move through the ground as said frame travels over the ground.

26. The apparatus of claim 23 wherein each cutter knife is secured to said harrow bar by a shear bolt.

27. The apparatus of claim 26 wherein the spacing between adjacent cutter knives on each harrow bar is from between six to eight inches.

28. The apparatus of claim 23 wherein the means for oscillating said harrow bars comprises:

(a) a plurality of harrow bar support arms movably attaching said harrow bars to said frame;

(b) a flywheel carried by said frame and rotationally operable by an external power source;

(c) a connecting member attached to the periphery of said flywheel linkably connected to said support arms so that rotational movement of said flywheel causes said harrow bars to move laterally in opposite directions from each other.

29. The apparatus of claim 18 further comprising a seed box on said frame for carrying a supply of seed, said seed box being in communication with each of said dispensing boots dispensing seeds through same in response to the rotation of said ground engaging wheels.

30. The apparatus of claim 23 wherein said covering plate is adjustable in height above each dispensing boot permitting the seeds to be covered to an adjustable depth.

31. The apparatus of claim 18 further comprising a roller attached to said frame compacting the ground after the seeds have been inserted into the ground and the furroughs have been covered.

32. The apparatus of claim 31 wherein said roller is rigidly attached to said frame.

33. The apparatus of claim 31 wherein said roller is movably attached to said frame and is urgeable toward the ground.

* * * * *

UNITED STATES PATENT AND TRADEMARK OFFICE
CERTIFICATE OF CORRECTION

PATENT NO. : 4,265,186

DATED : May 5, 1981

INVENTOR(S) : William K. Nichols

It is certified that error appears in the above—identified patent and that said Letters Patent is hereby corrected as shown below:

In the Abstract, line 2, insert "a" after -- comprises --.

In the specification,

Column 2, line 29, "deth" should read -- depth --.

Column 7, line 4 should read "communication with each of the ".

Signed and Sealed this

Fourth Day of August 1981

[SEAL]

Attest:

Attesting Officer

GERALD J. MOSSINGHOFF

Commissioner of Patents and Trademarks